United States Patent
Herwig

(10) Patent No.: US 9,365,907 B1
(45) Date of Patent: Jun. 14, 2016

(54) CONVERSION OF TROUBLESOME LIME FINES TO USEFUL HIGH QUALITY FLUIDIZED LIME IN FEEDING FLUX LIME TO A BOF CONVERTER

(71) Applicant: ALMAMET USA, Inc., New Castle, PA (US)

(72) Inventor: Frank Herwig, Groditz (DE)

(73) Assignee: Almamet USA, Inc., New Castle, PA (US)

(*) Notice: Subject to any disclaimer, the term of this patent is extended or adjusted under 35 U.S.C. 154(b) by 120 days.

(21) Appl. No.: 14/200,598

(22) Filed: Mar. 7, 2014

Related U.S. Application Data

(60) Provisional application No. 61/781,325, filed on Mar. 14, 2013.

(51) Int. Cl.
| | |
|---|---|
| C21C 7/00 | (2006.01) |
| C21C 7/076 | (2006.01) |
| C04B 2/02 | (2006.01) |
| B02C 23/08 | (2006.01) |
| B07B 1/28 | (2006.01) |
| C21C 7/064 | (2006.01) |

(52) U.S. Cl.
CPC .............. *C21C 7/0645* (2013.01); *B02C 23/08* (2013.01); *B07B 1/28* (2013.01); *C04B 2/02* (2013.01); *C21C 7/0037* (2013.01); *C21C 7/076* (2013.01)

(58) Field of Classification Search
CPC ........ C21C 7/0037; C21C 7/076; C04B 2/02; B02C 23/08; B07B 1/28
See application file for complete search history.

(56) References Cited

U.S. PATENT DOCUMENTS

| | | | |
|---|---|---|---|
| 2,906,616 A | 9/1959 | Allard et al. | |
| 2,912,319 A | 11/1959 | Moklebust | |
| 3,857,698 A * | 12/1974 | Gilpin | C21C 5/36 148/26 |
| 4,007,034 A | 2/1977 | Hartwig et al. | |
| 4,139,369 A | 2/1979 | Kandler et al. | |
| 4,142,887 A | 3/1979 | Luyckx | |
| 4,279,643 A | 7/1981 | Jackman | |
| 4,316,741 A | 2/1982 | Wetzel | |
| 4,374,664 A | 2/1983 | Mitsuo et al. | |
| 4,392,887 A | 7/1983 | Goedert | |
| 4,420,333 A | 12/1983 | Takahashi et al. | |
| 4,422,873 A | 12/1983 | Yamada et al. | |
| 4,444,656 A * | 4/1984 | Nelson | B07B 1/28 209/347 |
| 4,528,031 A | 7/1985 | Hacetoglu et al. | |
| 4,561,894 A | 12/1985 | Fontaine et al. | |

(Continued)

OTHER PUBLICATIONS

Herwig, Frank, "Treatment of converter lime—undersize for the pig iron desulphurization", Sep. 9, 2008 (Distributed at Almamet Symposium in Lisbon, Portugal).

*Primary Examiner* — George Wyszomierski
*Assistant Examiner* — Tima M McGuthry Banks
(74) *Attorney, Agent, or Firm* — Beck & Thomas, P.C.

(57) ABSTRACT

Crushed flux lime to be used in a BOF converter is processed to minimize waste dust, obviate environmental complications caused by high pH in waste water, and to utilize a very high percentage of the original crushed lime for useful products. The crushed flux lime is screened to provide a fine grain fraction and a modified flux lime fraction. Only a small percentage of the modified flux lime fraction is dust which may be removed in a dust collection system, and the modified flux lime fraction is then passed to the BOF converter. The fine grain fraction is made into a highly fluidized lime of very small dimensions by pulverizing it further in the presence of a fluidizing agent.

20 Claims, 2 Drawing Sheets

PROCESS BLOCK DIAGRAM

(56) References Cited

U.S. PATENT DOCUMENTS

| | | |
|---|---|---|
| 4,586,955 A | 5/1986 | Hammer et al. |
| 4,705,561 A | 11/1987 | Green |
| 4,714,202 A * | 12/1987 | Shulof .................... B02C 25/00 241/30 |
| 4,738,715 A | 4/1988 | Muller |
| 4,814,005 A | 3/1989 | Thompson |
| 5,228,902 A | 7/1993 | Bogan et al. |
| 5,972,072 A | 10/1999 | Kinsman et al. |
| 6,391,266 B1 | 5/2002 | Lavely, Jr. |
| 2007/0193412 A1* | 8/2007 | Manning .................... C21C 7/04 75/565 |
| 2009/0013827 A1* | 1/2009 | Wolfe .................... C21C 7/0037 75/433 |

\* cited by examiner

Fig. 1 PROCESS BLOCK DIAGRAM

CONVERSION OF TROUBLESOME LIME FINES TO USEFUL HIGH QUALITY FLUIDIZED LIME IN FEEDING FLUX LIME TO A BOF CONVERTER

CROSS-REFERENCE TO RELATED APPLICATIONS

This application claims the benefit of U.S. Provisional Application No. 61/781,325, filed Mar. 14, 2013 which is hereby incorporated by reference in its entirety.

TECHNICAL FIELD

Excessive lime fines conventionally cause serious stack losses, overloads, and related problems in dust collectors and other environmental treatment systems associated with the feeding of crushed burnt lime to the BOF converter in steel making facilities. The invention separates the fines in a screening step and captures them for conversion by a treating and grinding system into products useful not only in the steel making process but in other industrial processes.

BACKGROUND OF THE INVENTION the basic oxygen steelmaking process is as follows. Molten pig iron (referred to as "hot metal") from a blast furnace is poured into a large refractory-lined container called a ladle. The metal in the ladle is sent directly for basic oxygen steelmaking or to a pretreatment stage. Pretreatment of the blast furnace hot metal is used to reduce the refinement of sulfur, silicon, and phosphorus. In the desulfurizing pretreatment, a lance is lowered into the molten iron in the ladle and several hundred kilograms of powdered magnesium (or sometimes other materials, such as calcium carbide) are added by pneumatic injection. Sulfur impurities are reduced to magnesium sulfide in a violent exothermic reaction. The magnesium sulfide is then raked off. Similar pretreatment is possible for desiliconization and dephosphorization using mill scale (iron oxide) and lime as reagents. The decision to pretreat depends on the quality of the blast furnace hot metal and the required final quality of the basic oxygen furnace ("BOF") steel.

Filling the furnace with the ingredients is called charging. The BOF process is autogenous, the required thermal energy is produced during the process. Maintaining the proper charge balance, the ratio of hot metal to scrap, is therefore very important. The BOF vessel may be one-fifth filled with steel scrap. Molten iron from the ladle is added as required by the charge balance. A typical chemistry of hot metal charged into the BOF vessel is: 4% C, 0.2-0.8% Si, 0.08%-0.18% P, and 0.002-0.005% S.

The vessel is then set upright and a water-cooled lance is lowered down into it. The lance blows 99% pure oxygen onto the steel and iron, igniting the carbon dissolved in the steel and burning it to form carbon monoxide and carbon dioxide, causing the temperature to rise to about 1700° C. This melts the scrap, lowers the carbon content of the molten iron and helps remove unwanted chemical elements. It is this use of oxygen instead of air that improves upon the now discontinued Bessemer Process, as the nitrogen (and other gases) in air do not react with the charge as oxygen does. High purity oxygen is blown into the furnace or BOF vessel through a vertically oriented water-cooled lance with velocities faster than Mach 1.

Details and parameters of the above description may vary; it is intended to provide the reader with a typical background for the invention.

Fluxes (burnt lime or dolomite) are fed into the vessel to form slag, which absorbs impurities of the steelmaking process. A prior art process fed a crushed burnt lime (80 mm×down) flux to help form the slag. During blowing the metal in the vessel forms an emulsion with the slag, facilitating the refining process. Near the end of the blowing cycle, which takes about 20 minutes, the temperature is measured and samples are taken. The samples are tested and a computer analysis of the steel given within six minutes. A typical chemistry of the blown metal is 0.3-0.6% C, 0.05-0.1% Mn, 0.01-0.03% Si, 0.01-0.03% S and P.

The lime flux removes impurities and forms a slag that can be separated from the steel and poured from the furnace as a liquid. It also reduces refractory wear and gunning. Pebble quicklime is used, unless a finer product is required by specialty furnace injection applications. A BOF process commonly uses the pebble lime sized at 80 mm×down. The 80×down sized lime created several costly and time consuming problems at the facility. The excess fines were drawn off by the dust collection system was material that was lost. Not only were the dust collection fines a loss of raw material it also created a waste disposal stream. In addition, the fines from the 80 mm×down sized material seriously overloaded the bag house and wet scrubbers. This caused serious environmental and maintenance problems along with the loss of lime during the lime charging process and all the associated costs incurred.

Typically, from 8-15%, or even occasionally as high as 20%, by weight of the soft-burned pebble (80 mm×down) quicklime fed to the basic oxygen furnace in the above mentioned commercial process was lost in the dust collection system prior to the present invention. The invention not only recovers this portion of the original 80 mm×down feed (or other defined pebble lime) and obviates the costs associated with clogging and waste disposal, but also creates a high-value product from it.

SUMMARY OF THE INVENTION

This invention provides a unique and novel process to be integrated into the soft burnt lime feed stream in a BOF converter production process to eliminate the problem caused by the fines (10 mm×down, sometimes herein called "lime fines") from the 80 mm×down sized flux lime. This process consists in part of a screening operation prior to the feeding of the flux lime into the converter. The lime fines are screened from the feed stream of the 80 mm×down flux lime. This screened material, without the fines, is then fed into the converter. This material, a modified flux lime 80 mm×10 mm, having been stripped of lime fines (material lower than 10 mm), significantly reduces material loss to waste, reduces the environmental problems associated with the over loading of fines in the dry and wet dust collectors, and reduces loss production time and the costs attributed to these factors in the BOF converter process.

The screened lime fines, the 10 mm×down, can then be diverted into a storage silo. From this storage silo, or directly from the screen, the lime fines are then processed into a fine grain lime (0.1 mm×down) by the application of various feeding, screening, grinding equipment, and further into a high quality fluidized lime with the addition of fluidizers. A portion of the high quality fluidized lime fines produced by the invention may be used in a sintering plant and the balance of the high quality fluidized lime produced in the uniquely designed fluidized lime production plant can be sold to other customers. The invented system is one that is highly automated and capable of processing 30,000 tons annually of troublesome and costly lime fines into a high quality fluidized lime for sale and use in the hot metal desulfurization process. The design, engineering, know-how and innovative lime grinding technology enables this invention to produce a high quality fluidized lime from a portion of the 80 mm×down lime flux fed stream to the converter that ultimately, formerly, wound up as a costly waste material.

As is known in the art, dust collection systems are installed in lime systems for basic oxygen furnace (BOF) converters and desulfurization because the very small particles unavoidably present can escape into the atmosphere and environment of the steelmaking facility. The invention is not limited in terms of the precise cutoffs or fractions described above. For example, if an operator chooses to use a 90 mm×down sized flux lime instead of 80 mm×down, and/or screens the fraction 12 mm×down, the invention is equally applicable. The invention is applicable to any flux lime intended for use in a basic oxygen furnace (it may be called flux lime below) and can make a high quality fluidized lime from a fine grain fraction of the lime fines; the lime fines, while usually 10 mm×down, may be a somewhat wider range such as 12 mm×down or can have an even higher limit. It should be understood that terms in this description such as "80 mm×down" and other ranges of size for lime particulates are meant as "nominal" size ranges, in that there may unavoidably be small portions by weight of particles outside the intended or target ranges.

DETAILED DESCRIPTION OF THE INVENTION

Description of the Screening of the 80 mm×Down Flux Lime

Figure 1:
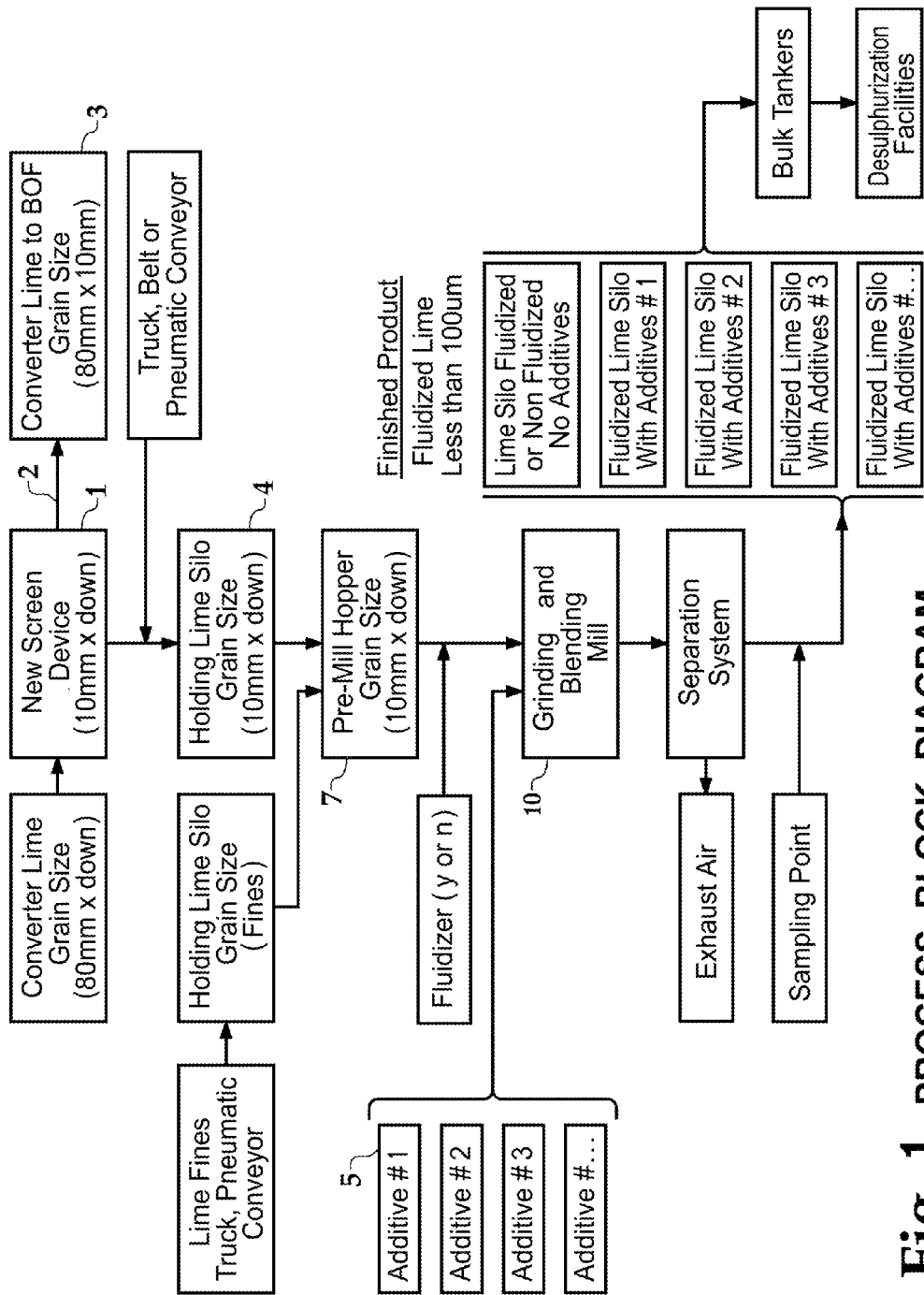
FIG. 1 is a block diagram of the improved process for preparing flux lime for use in a converter while also making separately useful products from the fines in the flux lime.

The processing of the high quality fluidized lime begins with the screening of the 80 mm×down converter flux lime material, FIG. 1 shows the Process Block Diagram of the entire screening and grinding operation. A complete description of the lime grinding technology is discussed in the section on FLUIDIZED LIME PRODUCTION FROM 10 MM×DOWN FINES. A 10 mm sized screen 1 is inserted into the 80 mm×down flux lime feed stream to remove the 1×down lime fines. This then produces an 80 mm×10 mm lime feed stream 2 going to the converter 3. The elimination of these 10 mm×down fines significantly reduces the majority of the problems mentioned elsewhere herein. The cost savings associated with the elimination of these problems are significant. Screen 1 is a vibratory screen inserted into a belt conveyor system moving the converter lime (80 mm×down flux lime) to the BOF converter 3; the larger screened fraction (80 mm×10 mm) continues to the BOF while the screened 10 mm×down lime fines drop through the vibrating screen, and are transported by a belt conveyer to a storage silo 4 or sent directly to a hopper 7 for feeding the grinding and blending mill 10.

At least equally significant is the inventor's ingenious design and construction of a lime grinding operation that took a 10 mm×down (fines) flux lime stream, the majority of which wound up in waste streams and material lost out the stack, and converted it into a usable high quality fluidized lime. This material also may be consumed elsewhere in the steelmaking facility and the remaining material sold to other customers requiring a high quality fluidized lime for hot metal desulfurization. FIG. 1 shows where five or more different high quality fluidized lime products can be produced with the addition of various reagents 5, labeled Additive #1, Additive#2, Additive#3, and Additive# upstream of the grinding and blending mill 10. The combined savings from the elimination of the problems associated with the fine material loss, significant reduction in environmental problems associated with the overloading of the dust collection systems and the utilization of the high quality fluidized lime in other operations are significant.

Fluidized Lime Production from 10 mm×Down Fines

Fluidized lime is a fine grain lime (fraction below 100 µm) treated with a special additive (fluidizing reagent) to increase pneumatic flowability. This increase in fluidization or flowability allows the lime to be transported easily through process pipelines in a desulfurization plant.

Figure 2:
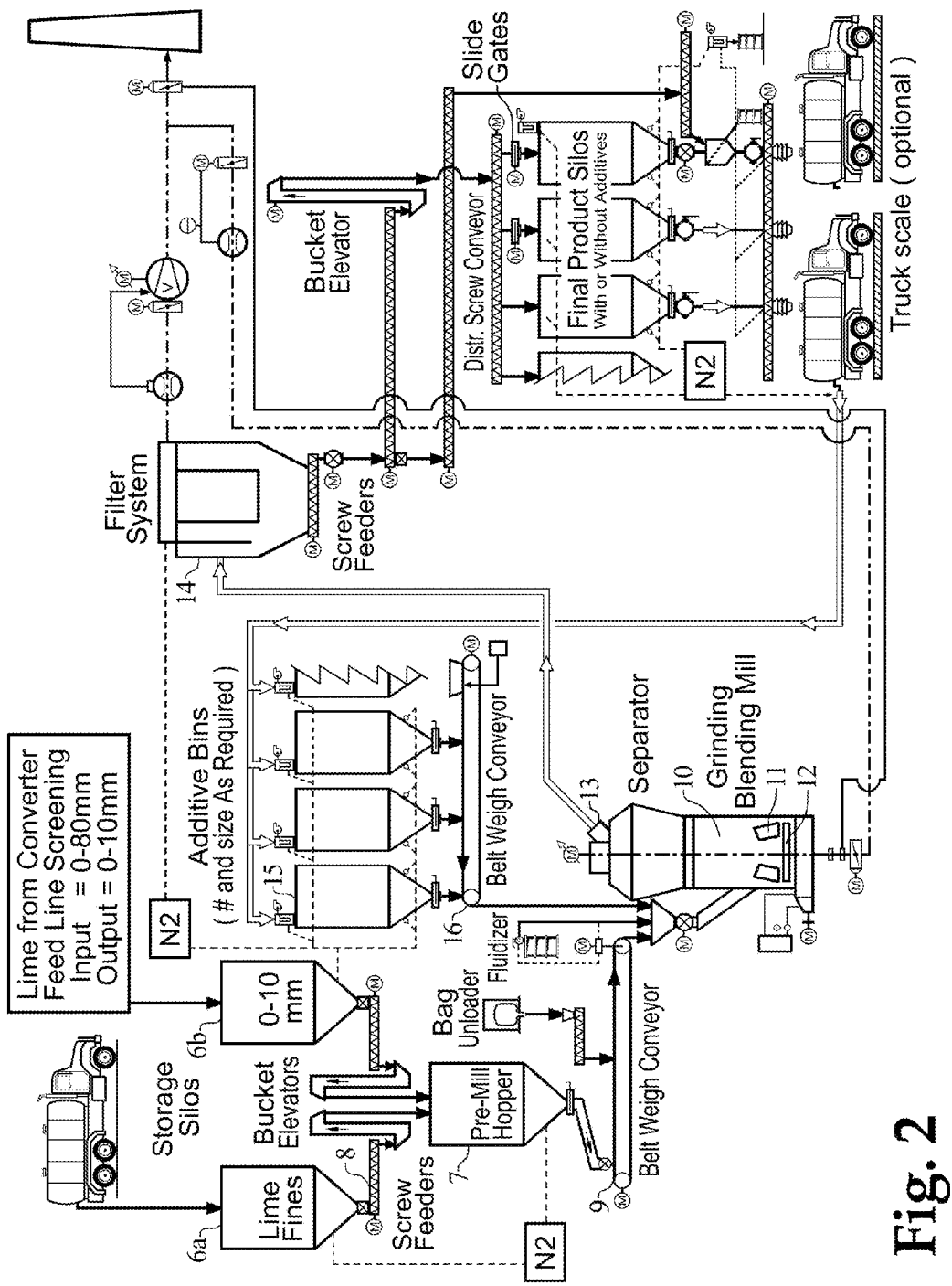
FIG. 2 is a more detailed flow diagram of the system for making fluidized lime from the fine grain lime fraction.

Referring now to FIG. 2, the 10 mm×down fines can be transported either by trucks or through a pneumatic piping system from the primary screening area 1 (FIG. 1) to a large storage silo 6a or 6b. The lime fines (10 mm×down fraction) are fed into a pre-mill hopper 7 by the use of a bucket elevator. From the storage silo 6b the lime fines may be transported into the daily pre-mill hopper 7 through a screw conveyer 8 with a metallic separator device for cleaning the lime stream from magnetic impurities. The outlet of the pre-hopper is equipped with a rotary valve, which controls the lime feed onto a weighting conveyor 9. The dosage and weighted lime stream then falls into the mill chute with another rotary valve directly in the milling zone of the grinding and blending mill 10. The stationary grinding rollers 11 roll on a slowly rotating grinding table 12. The material is drawn in between the grinding roller and the grinding track and ground by pressure and shear. The compressive force required for the grinding or pulverizing of the material is generated by a hydro-pneumatic tensioning system. The hydro-pneumatic tensioning system is able to respond to the amount and size of the material on the table 12 and under the rollers 11.

The material is ground and conveyed by centrifugal force towards a stationary nozzle ring—that is, a ring of nozzles able to deliver gas into the lower portion of grinding and blending mill 10. Process (inert) gas nitrogen flows up through the nozzle ring, mixes with the ground material and carries it up to the classifier (separator 13) above the grinding and blending mill 10. In the separating zone a rotating separating wheel (a turning wheel cage with variable speed) separates the ground and dried material into a fine finished product (which may be <100 µm) and miscellaneous unwanted material. This unwanted material falls back into the center of the grinding zone or is fully or partially extracted, for example through a cone, as a coupled product or otherwise. The finished product, desirably 100 µm (0.1 mm) or smaller, leaves the classifier together with the process nitrogen or other gas stream and is separated from the gas in downstream cyclones or a filter unit such as filter system 14. When feeding the input lime into the grinding mill 10, fluidizing reagents or other additives may be dispensed from bins 15 by way of a belt weigh conveyor 16, for example.

The fluidizer may function as grinding agent or, additionally, as fluidizer for the lime. The fluidizer is necessary to eliminate surface tension between the particles and increase flow ability of the material.

The advantages of this kind of grinding mill are:
fewer requirements of ancillary machines small space requirements
dust free operation
low noise level
low electric power consumption
optimal utilization of process heat (process air recycled)
system fully automatic In case it is required to produce a fluidized lime product with other additives (soda, kryolithe, spar or others) there is an extra hopper device for handling these material in big bags or super sacks. This hopper is equipped with a weighting system and screw feeder that feeds the material directly into the grinding mill. Air flow coming through a louver ring around the grinding table takes the pulverized material and transports it towards the upper installed separator. The ground or pulverized lime is transported in a nitrogen atmosphere from the grinding mill to the bag house collector. The fan generating the required reduced pressure and flow is located behind the filter. The product is then transported out of the bag filter into the vane feeder through a screw conveyor rotary value. The product is transported into the finished product silo or loaded into over the road bulk tanker trucks.

A belt bucket elevator can be used in case the lime is to be transported from the filtering unit on the top of the silos. Screw feeders are used to transport the fluidized lime into the right product storage silo. Some customers require other additives in their fluidized lime product so that additional storage silos can be installed. The outlet of the final product storage silo is equipped with a screening device (2 mm) and a telescopic discharging device for bulk tanker truck loading.

Equipment Requirements for the Lime Grinding Operation

This section gives an overview and technical specifications for all the equipment and the operating parameters required to produce a highly fluidized lime in the grinding and blending mill operation shown in FIG. 1.

1. Screen device:
Input: Lime grain size 0-10 mm
Output: lime 0-3 mm and 3-10 mm
Capacity: max. 10 ton/hr
Power: 4.0 KW/230 min-1
Weight: 2.000 kg
Dimension—2000×2000 mm
2. Silo 10 mm×down
Capacity: 80 ton
Equipped with:
Filter max. 15 mg/Nm$^3$
Over-/under pressure valve
Inspection door
Level indicators
Aeration system
Loading device for railway cars
3. Screw Feeder
Diameter: 250 mm
Capacity: 10 tons/hr
Power: 3.5 KW
Operation controlled
4. Bucket Elevator
Capacity: 10 tons/hr
Power: 3.5 kW
Operation controlled
5. Pre Mill Hopper
Capacity: 7 m$^3$ with emergency gate
Equipped with:
Filter max. 15 mg/Nm$^3$
Over-/under pressure valve
Inspection door
Level indicators
Aeration system
6. Slide Gate with Rotary Valve.
Diameter 250 mm
Capacity: 5 tons/hr
Power: 2.2 KW frequency transformer controlled
Connected with the mill regulation control system
7. Belt Weighting Conveyor
Range of adjustment rate: 1-10
Capacity: 1-7 tons/hr
Power: 0.55 kW
CPU controlled
8. Fluidizer Dosage Unit
Magnetic-membrane dosage pump
Free adjustable
CPU controlled
Fluidizer flow rate is from 0.8 up to 1.2 kg per ton of lime.
A special fluidizer supply unit
operating in auto mode is used.
9. Additive-Feeding Station
Designed for bulk bags and container
Scale and screw feeder
Lost weight system
Dosage rate from 2-10 weight % of milling product (5 tons/hr)
10. Grinding Mill
With chute and rotary valve
The mill includes the following parts:
 1. Lower section of the mill
 2. Upper section of the mill
 3. Grinding bowl
 4. rollers
 5. Set of grinding elements:
  5.1 multi section grinding table
  5.2 rollers made of wear resistant materials.
 6. Two combination levers
 7. Hydro-pneumatic system
 8. Hydraulic unit for Gear box.
 9. Standard industrial type motor, IP 55.
 10. Compensator at the mill outlet
 11. Separator
High performance separator with centrifugal screening performed through static louver ring and dynamic rotor.
12. Filter System for Separation of Process Air
12.000 Nm$^3$/hr under normal condition
equipped with:
Textile filter elements (life time 1.500 working hours)
Automatic filter element cleaning device
With required piping and control flaps and chimney and Fan (35 kW)
Collecting screw feeder and rotary valve
Product—fluidized lime less that 100 μm
Cleaning type—Jet Pulse
Working chamber temperature—minimum—10° C. maximum 80° C.
Nitrogen pressure—6 Bar
Cleaning capacity—<15 mg/nm$^3$
Filter cleans automatically with pulse pressure
13. Bucket Elevator
Capacity 8 tons/hr
Power 3.5 kW
Operation controlled automatic sampling device
14. Distribution Screw Conveyor with Slide Gates
Capacity: 8 tons/hr Power: 3.5 kW
Operation controlled
15. Final Product Silo #1
Capacity: 80 tons
Equipped with:
Filter max. 15 mg/Nm$^3$
Over-/under pressure valve
Inspection door
Level indicators
Aeration system
Screening device 2 mm
Loading device for silo truck
Loading device for silo truck (option, also loading device from silo 80 tons)
16. Bulk Bag Loading Station Equipped with
Screw feeder
Bulk bag loading frame with scale
Filter system
17. Truck Scale
As required
18. Process Automation System with Visualization
Gas measurement after filter
Pressure measurement before the mill
Pressure drop inside the mill
Pressure drop inside the filter
Temperature measurement after the mill
Transmitters are installed locally in mounting panel along with shut off valves etc. and are ready for installation onto pipelines.
Fully automated PLC controlled work station interface
19. Laboratory Equipment
Flow channel with compressor and vacuum cleaner
Camsizer XT (grain size distribution)
CO2/Water determinator (ELTRA)
Spectro iQ II with calibration
(MgO analyzer)
Nitrogen generator:
Capacity: min. 25 Nm$^3$/hour, max. 6 bar My invention includes a method of preparing lime for use in a steelmaking facility comprising (a) passing pebble flux lime through a screen to obtain a modified flux lime fraction and a fine grain lime fraction, (b) passing said modified flux lime fraction (i) through a dust collection system whereby no more than 3% by weight of said modified flux lime fraction is captured in said dust collection system and thereafter (ii) into a basic oxygen furnace, and (c) pulverizing said fine grain lime fraction to a size range of 0.1 mm or smaller.

While I have described a present preferred embodiment of the invention, it is to be distinctly understood that the invention is not limited thereto but may be otherwise embodied and practiced within the scope of the following claims.

I claim:

1. Method of making fluidized lime comprising (a) passing a stream of 0-100 mm crushed basic oxygen furnace flux lime through a screen to obtain (i) a fine grain 0-12 mm fraction and (ii) a modified flux lime fraction 10-100 mm, and (b) grinding said fine grain fraction in the presence of a fluidizer to obtain a fluidized lime.

2. Method of claim 1 wherein said crushed basic oxygen converter flux lime is 0-80 mm.

3. Method of claim 1 wherein said fine grain fraction (i) is 0-10 mm.

4. Method of claim 1 wherein said modified flux lime fraction (ii) is 10-80 mm.

5. Method of claim 1 wherein said fluidized lime obtained is 0-0.1 mm.

6. Method of claim 1 including passing said flux lime to a basic oxygen converter.

7. Method of claim 1 including injecting said fluidized lime into a basic oxygen converter.

8. Method of claim 1 wherein said screen in step (a) comprises a vibratory screen.

9. Method of claim 1 wherein said grinding of said fine grain fraction in step (b) is performed by stationary grinding wheels on a revolving table.

10. Method of claim 9 including applying tension on said stationary grinding wheels to control the grinding process.

11. Method of claim 9 including conveying pulverized lime upwardly by nitrogen from said revolving table to a centrifugal screening separator including a static louver ring and a dynamic rotor.

12. Method of claim 1 wherein step (a) includes conveying said flux lime on a conveyor belt to at least one vibrating screen, passing said fine grain fraction through said screen, and further conveying said modified flux fraction for grinding in step (b).

13. Method of preparing lime for use in a steelmaking facility comprising (a) passing flux lime through a screen to obtain a modified flux lime fraction and a fine grain lime fraction, (b) passing said modified flux lime fraction (i) through a dust collection system whereby no more than 3% by weight of said modified flux lime fraction is captured in said dust collection system and thereafter (ii) into a basic oxygen furnace, and (c) pulverizing said fine grain lime fraction in the presence of a fluidizer to a size range of 0.1 mm or smaller.

14. Method of claim 13 including adding a fluidizer to said fine grain lime fraction prior to or during step (c).

15. Method of claim 13 wherein said modified lime fraction has a nominal size range of 10-80 mm.

16. Method of claim 13 wherein said fine grain lime fraction has a nominal size range of 0-10 mm.

17. Method of claim 13 wherein said screen in step (a) comprises at least one vibratory screen.

18. Method of claim 17 wherein said screen in step (a) comprises three vibratory screens.

19. Method of claim 13 wherein said pulverizing in step (c) includes applying tension to stationary grinding wheels on a rotating grinding table.

20. Method of claim 13 including adding the pulverized fine grain lime fraction having a size range of 0.1 mm or smaller obtained in step (c) to hot metal to remove sulfur therefrom.

* * * * *